(12) United States Patent
Poelma et al.

(10) Patent No.: US 11,299,576 B2
(45) Date of Patent: Apr. 12, 2022

(54) SUSTAINABLE CHEMISTRY SYSTEMS FOR RECYCLABLE DENTAL MODELS AND OTHER ADDITIVELY MANUFACTURED PRODUCTS

(71) Applicant: Carbon, Inc., Redwood City, CA (US)

(72) Inventors: Justin Poelma, Sunnyvale, CA (US); Mu San Zhang, San Francisco, CA (US); Xinyu Gu, San Mateo, CA (US); Jason P. Rolland, San Carlos, CA (US); Joseph M. DeSimone, Monte Sereno, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/053,959

(22) PCT Filed: May 9, 2019

(86) PCT No.: PCT/US2019/031456
§ 371 (c)(1),
(2) Date: Nov. 9, 2020

(87) PCT Pub. No.: WO2019/217641
PCT Pub. Date: Nov. 14, 2019

(65) Prior Publication Data
US 2021/0246252 A1 Aug. 12, 2021

Related U.S. Application Data

(60) Provisional application No. 62/670,174, filed on May 11, 2018.

(51) Int. Cl.
| | | |
|---|---|---|
| C08F 290/06 | (2006.01) |
| B33Y 10/00 | (2015.01) |
| B33Y 70/00 | (2020.01) |
| B29C 64/314 | (2017.01) |
| B29C 64/357 | (2017.01) |
| B29C 64/165 | (2017.01) |
| B33Y 40/10 | (2020.01) |
| B29B 11/06 | (2006.01) |
| B29B 17/04 | (2006.01) |
| C08G 18/08 | (2006.01) |
| C08G 18/10 | (2006.01) |
| C08G 18/32 | (2006.01) |
| C08G 18/48 | (2006.01) |
| C08G 18/75 | (2006.01) |
| C08G 18/80 | (2006.01) |
| C08J 3/12 | (2006.01) |
| C08L 55/00 | (2006.01) |
| C09D 175/16 | (2006.01) |
| C08K 5/00 | (2006.01) |
| B29K 75/00 | (2006.01) |

(52) U.S. Cl.
CPC .......... *C08F 290/067* (2013.01); *B29B 11/06* (2013.01); *B29B 17/0404* (2013.01); *B29C 64/165* (2017.08); *B29C 64/314* (2017.08); *B29C 64/357* (2017.08); *B33Y 10/00* (2014.12); *B33Y 40/10* (2020.01); *B33Y 70/00* (2014.12); *C08G 18/0895* (2013.01); *C08G 18/10* (2013.01); *C08G 18/325* (2013.01); *C08G 18/3206* (2013.01); *C08G 18/4854* (2013.01); *C08G 18/755* (2013.01); *C08G 18/808* (2013.01); *C08J 3/12* (2013.01); *C08K 5/0041* (2013.01); *C08L 55/005* (2013.01); *C09D 175/16* (2013.01); *B29K 2075/00* (2013.01); *C08J 2375/16* (2013.01)

(58) Field of Classification Search
None
See application file for complete search history.

(56) References Cited

U.S. PATENT DOCUMENTS

| | | |
|---|---|---|
| 3,213,058 A | 10/1965 | Boyle et al. |
| 3,694,389 A | 9/1972 | Levy |
| 5,236,637 A | 8/1993 | Hull |
| 5,391,072 A | 2/1995 | Lawton et al. |
| 5,529,473 A | 6/1996 | Lawton et al. |
| 5,801,224 A | 9/1998 | Narayan et al. |
| 6,552,124 B2 | 4/2003 | Wang et al. |
| 6,861,475 B2 | 3/2005 | Ilenda et al. |
| 6,916,867 B2 | 7/2005 | Gugumus |
| 7,157,586 B2 | 1/2007 | Wood et al. |
| 7,438,846 B2 | 10/2008 | John |
| 7,625,977 B2 | 12/2009 | Lutz et al. |
| 7,642,316 B2 | 1/2010 | Rego et al. |
| 7,695,643 B2 | 4/2010 | Fritzsche et al. |

(Continued)

FOREIGN PATENT DOCUMENTS

| | | |
|---|---|---|
| EP | 0411576 A2 | 2/1991 |
| WO | 2015164234 A1 | 10/2015 |

(Continued)

OTHER PUBLICATIONS

Liu, et al., "Oxime-Based and Catalyst-Free Dynamic Covalent Polyurethanes", Journal of the American Chemical Society, 139, 8678-8684, 2017. (Year: 2017).*
Velankar, et al. "High Performance UV Curable Urethane Acrylates via Deblocking Chemistry", Journal of Applied Polymer Science, (62), 1361-1376, 1976. (Year: 1976).*
International Preliminary Report on Patentability corresponding to PCT/US2019/031456; dated Sep. 10, 2020 (20 pages).

(Continued)

*Primary Examiner* — Christopher M Rodd
(74) *Attorney, Agent, or Firm* — Myers Bigel, P.A.

(57) ABSTRACT

Provided herein are methods of recycling additively manufactured objects, which may include making a reactive particulate material by recycling preformed articles or recovered coating material. Methods of use of the reactive particulate material and material sets including the same are also provided.

25 Claims, No Drawings

(56) References Cited

U.S. PATENT DOCUMENTS

| | | |
|---|---|---|
| 7,892,474 B2 | 2/2011 | Shkolnik et al. |
| 8,088,245 B2 | 1/2012 | Lutz et al. |
| 8,110,135 B2 | 2/2012 | El-Siblani |
| 8,142,868 B2 | 3/2012 | OBrien et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,464,209 B2 | 10/2016 | Dudik et al. |
| 9,598,606 B2 | 3/2017 | Rolland et al. |
| 2006/0014099 A1 | 1/2006 | Faler et al. |
| 2012/0171470 A1 | 7/2012 | Cavallin et al. |
| 2013/0292862 A1 | 11/2013 | Joyce |
| 2013/0295212 A1 | 11/2013 | Chen et al. |
| 2015/0184039 A1 | 7/2015 | Lutz et al. |
| 2015/0240113 A1 | 8/2015 | Pratt et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2018/0015664 A1 | 1/2018 | Kabalnov et al. |
| 2018/0126630 A1 | 5/2018 | Panzer et al. |
| 2018/0243976 A1 | 8/2018 | Feller |
| 2018/0290374 A1 | 10/2018 | Willis et al. |
| 2020/0406550 A1 | 12/2020 | Zhang et al. |

FOREIGN PATENT DOCUMENTS

| | | |
|---|---|---|
| WO | 2016068899 A1 | 5/2016 |
| WO | 2016133759 A1 | 8/2016 |
| WO | 2016145182 A1 | 9/2016 |
| WO | 2017188966 A1 | 11/2017 |
| WO | 2017189306 A1 | 11/2017 |
| WO | 2017196321 A1 | 11/2017 |
| WO | 2017196358 A1 | 11/2017 |
| WO | 2017196361 A1 | 11/2017 |
| WO | 2017196364 A1 | 11/2017 |
| WO | 2017213666 A1 | 12/2017 |
| WO | 2018022051 A1 | 2/2018 |

OTHER PUBLICATIONS

International Search Report and Written Opinion corresponding to PCT/US2019/031456; dated Sep. 20, 2019 (17 pages).
International Search Report and Written Opinion corresponding to PCT/US2019/031458; dated Nov. 14, 2019 (13 pages).
Written Opinion corresponding to PCT/US2019/013456; dated May 18, 2020 (7 pages).
Written Opinion of the International Preliminary Examining Authority corresponding to PCT/US2019/031456; dated Jul. 23, 2020 (11 pages).
Tri-iso Information Sheet, Trixene Blocked Isocyanates, 2 pp.
Asua, Jose M., "Emulsion Polymerization: From Fundamental Mechansims to Process Developments", J of Polymer Sci: Part A: Polymer Chemistry, 42, 2004, 1025-1041.
Crawford, Deborah E., "Extrusion—back to the future: Using an established technique to reform automated chemical synthesis", Beilstein J. Org. Chem. 13, 2017, 65-75.
Janusziewicz, Rima , et al., "Layerless fabrication with continuous liquid interface production", PNAS, 113, 2016, 11703-11708.
Liu, Wen-Xing , et al., "Oxime-Based and Catalyst-Free Dynamic Covalent Polyurethanes", J. Am. Chem. Soc., 139 (25), 2017, 8678-8684.
Malik, Jitendra , et al., "A thermally reworkable UV curable acrylic adhesive prototype", International Journal of Adhesion & Adhesives, 22(4), 2020, 283-289.
Malik, Jitendra , et al., "Comparative Study of Novel Polymer Prototype for Controlled Thermally Reworkable UV Curable Acrylic Adhesives in Absence and Presence of Reactive Diluent", Surface Engineering, 19(2), 2003, 121-126.
Schmidt, J., et al., "Novel Approaches for the Production of Polymer Powders for Selective Laser Beam Melting of Polymers", Solid Freeform Fabrication 2016: Proceedings of the 27th Annual International Solid Freeform Fabrication Symposium, 762-769.
Tumbleston, John R., et al., "Continuous liquid interface production of 3D Objects", Science, 347(6228), 2015, 1349-1352.
Velankar, Sachin , et al., "High-Performance UV-Curable Urethane Acrylates via Deblocking Chemistry", Journal of Applied Polymer Science, 62(9), 1996, 1361-1376.
Zhang, Ze Ping , et al., "Mechanically Robust, Self-Healable, and Highly Stretchable "Living" Crosslinked Polyurethane Based on a Reversible C—C Bond", Advanced Functional Materials, 28(11), 2018, 8 pp.
Zhang, Biao , et al., "Reprocessable thermosets for sustainable three-dimensional printing", Nature Communications, 9(1), 2018, 1-7.

* cited by examiner

SUSTAINABLE CHEMISTRY SYSTEMS FOR RECYCLABLE DENTAL MODELS AND OTHER ADDITIVELY MANUFACTURED PRODUCTS

CROSS REFERENCE TO RELATED APPLICATIONS

This application is a 35 U.S.C. § 371 national phase application of International Application Serial No. PCT/US2019/031456, filed May 9, 2019, which claims priority to U.S. Provisional Application Ser. No. 62/670,174, filed May 11, 2018, the entire contents of which are hereby incorporated by reference.

FIELD OF THE INVENTION

The present invention concerns additive manufacturing in general, and particularly concerns resins suitable for producing additively manufactured products that can be recycled, the products of such recycling, and methods of using such products.

BACKGROUND OF THE INVENTION

In conventional additive manufacturing techniques (often referred to as "3D printing"), construction of a three-dimensional object is performed in a step-wise or layer-by-layer manner by sequentially exposing a light-polymerizable resin to patterned light.

Generally referred to as "stereolithography," numerous examples are known, including those described in U.S. Pat. No. 5,236,637 to Hull (see, e.g., FIGS. 3-4) and U.S. Pat. No. 7,892,474 to Shkolnik. Additional examples are given in U.S. Pat. Nos. 5,391,072 and 5,529,473 to Lawton, U.S. Pat. No. 7,438,846 to John, U.S. Pat. No. 8,110,135 to El-Siblani, and U.S. Patent Application Publication Nos. 2013/0292862 to Joyce and 2013/0295212 to Chen et al.

Unfortunately, additive manufacturing techniques have generally been slow, and have long been known to produce parts with a limited range of mechanical properties, frequently rendering such products unsuitable for real world use beyond simple prototyping.

More recently, techniques referred to as "continuous liquid interface production" (or "CLIP") have been developed. These techniques enable the rapid production of three-dimensional objects, preferably in a layerless manner, by which the parts may have desirable structural and mechanical properties. See, e.g., J. DeSimone et al., U.S. Pat. Nos. 9,211,678; 9,205,601; and 9,216,546; J. Tumbleston, et al., Continuous liquid interface production of 3D Objects, Science 347, 1349-1352 (2015), and R. Janusziewcz et al., *Layerless fabrication with continuous liquid interface production*, Proc. Natl. Acad. Sci. USA 113, 11703-11708 (2016). The increasing availability of additive manufacturing techniques for the manufacture of real-world articles, beyond prototyping, creates a need for new sustainable chemistry approaches in this field.

SUMMARY OF THE INVENTION

Provided herein is a method of making a reactive particulate material by recycling preformed articles (e.g., dental models) or recovered coating material, including the steps of: (a) providing preformed articles, or recovered coating material, the preformed articles produced by a process of light polymerizing a single-cure resin in an additive manufacturing (or coating) process, the resin comprising or consisting essentially of: (i) a reactive blocked polyurethane prepolymer, a reactive blocked polyurea prepolymer, a reactive blocked polyurethane-polyurea copolymer, or a combination thereof, (ii) optionally a reactive diluent, and (iii) a photo-initiator; and then (b) comminuting (e.g., by grinding, shredding, chopping, or pelletizing) the preformed articles into a reactive particulate material. The reactive particulate material has a variety of uses, as discussed further below.

While the present invention is described primarily with reference to the recycling of dental models, it will be appreciated that other additively manufactured products can be produced and recycled in like manner as described herein.

In addition, while the reactive particulate material described herein is primarily described as being produced by the recycling of other additively manufactured products, it will be appreciated that such particles can be produced directly, as an original product, for any of the further uses described herein.

In some embodiments, the preformed article is comprised of: at least 70, 80 or 90 percent by weight of a polymer, said polymer consisting essentially of said resin in light polymerized, cross-linked, thermoset form; optionally, pigments and/or dyes; and optionally, at least one filler.

In some embodiments, the resin comprises not more than 1 or 5 percent by weight of a diol (or polyol) and/or polyamine chain extender. In some embodiments, the article or model is produced by a process that does not include an additional polymerization step (e.g., a heat polymerization step) following said light polymerization step in the presence of a chain extender. In some embodiments, the resin is solely polymerized by light polymerization in said process. In some embodiments, the resin does not include at least one constituent necessary for heat and/or microwave polymerization.

In some embodiments, the single-cure resin further comprises a nonreactive blocked polyurethane prepolymer (e.g., blocked with DMP, MEKO, etc).

In some embodiments, the reactive blocked polyurethane prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the reactive blocked polyurethane prepolymer comprises a (meth)acrylate-blocked polyurethane prepolymer.

In some embodiments, the reactive diluent is present and comprises an acrylate, a methacrylate, a styrene, an acrylic acid, a vinylamide, a vinyl ether, a vinyl ester, polymers containing any one or more of the foregoing, and combinations of two or more of the foregoing (e.g., acrylonitrile, styrene, divinyl benzene, vinyl toluene, methyl acrylate, ethyl acrylate, butyl acrylate, methyl (meth)acrylate, an amine (meth)acrylate such as TBAEMA, and mixtures thereof).

In some embodiments, the reactive diluent comprises a monofunctional reactive diluent (e.g., isobornyl methacrylate).

In some embodiments, the additive manufacturing process comprises top-down or bottom-up stereolithography (e.g., continuous liquid interface production).

Also provided is a reactive particulate material produced by a process as taught herein (for example, a powder comprising particles having an average size of from 1 or 2 microns, to 100, 200 or 300 microns).

Further provided is a material set comprising: (a) a reactive particulate material produced by a process as taught herein as a powder bed material; and (b) a fusing agent. In some embodiments, the fusing agent comprises a sprayable composition comprising: (i) a crosslinker such as a diisocyanate, alkyl dihalide (e.g., 1,4-dibromobutane), dicarboxylic acid, diacyl halide, diepoxide, or a mixture thereof; and/or (ii) a polyol and/or polyamine chain extender.

Also provided is a method of making a three-dimensional object in which a fusing agent is applied to a bed of a particulate material in sequential patterned repetitions thereof, comprising: employing a reactive particulate material produced as taught herein as the particulate material in combination with a fusing agent (e.g., (i) a crosslinker such as a diisocyanate, alkyl dihalide (e.g. 1,4-dibromobutane), dicarboxylic acid, diacyl halide, diepoxide, or a mixture thereof; and/or (ii) a polyol and/or polyamine chain extender), optionally while heating said particulate before and/or after said fusing agent is applied.

Further provided is a method of coating an object in which a particulate is applied to the object with a reactive resin, comprising: employing a reactive particulate material as taught herein as the particulate in combination with a polyol and/or polyamine chain extender as the reactive resin, optionally while heating the object before and/or after applying said particulate and resin thereto.

Also provided is a method of making a staple thermoplastic material, comprising: reacting a reactive particulate material produced as taught herein with a polyol and/or polyamine chain extender under conditions in which a homogeneous thermoplastic material is produced; and then, forming said homogeneous thermoplastic material into either a new object, or a staple article for subsequent use (e.g., pellets, sheets, filaments, a powder, etc). In some embodiments, the reacting step is carried out by co-extrusion of said reactive particulate material with said chain extender (e.g., in a twin-screw extruder). In some embodiments, the reacting step is carried out at a temperature of 30° C. to 350° C. In some embodiments, the thermoplastic material comprises a blend of linear or branched chain extended polyurethane or polyurethane-urea polymers and poly(isobornyl methacrylate-co-tert-butylaminoethyl methacrylate).

Still further provided is a staple article so produced (for example, pellets, sheets, or a powder, the powder comprising particles having an average size of from 1 or 2 microns, to 100, 200 or 300 microns).

Also provided is a method of making an object comprising: providing a staple article produced as taught herein; and then, forming a new article, or a coating on an object, from said staple article (e.g., by injection molding, blow molding, thermoforming, selective laser sintering, jet fusion, powder coating, etc.).

Also provided is a method of making a recyclable preformed article (e.g., a dental model), comprising: (a) providing a single-cure resin comprising or consisting essentially of: (i) a reactive blocked polyurethane prepolymer, a reactive blocked polyurea prepolymer, a reactive blocked polyurethane-polyurea copolymer, or a combination thereof, (ii) optionally a reactive diluent, and (iii) a photo-initiator; and then, (b) light polymerizing said resin in an additive manufacturing process to produce said preformed article.

In some embodiments, the preformed article is comprised of: at least 70, 80 or 90 percent by weight of a polymer, said polymer consisting essentially of said resin in light polymerized, cross-linked, thermoset form; optionally, pigments and/or dyes; and optionally, at least one filler.

In some embodiments, the resin comprises not more than 1, 2 or 5 percent by weight of a polyol and/or polyamine chain extender;

In some embodiments, the article or model is produced by a process that does not include an additional polymerization step (e.g., a heat polymerization step) following said light polymerization step in the process of a chain extender. In some embodiments, the resin is solely polymerized by light polymerization in said process. In some embodiments, the resin does not include at least one component necessary for heat and/or microwave polymerization.

In some embodiments, the method further comprises comminuting the preformed article, and optionally wherein the comminuting step is carried out by grinding, shredding, chopping, or pelletizing.

In some embodiments, the additive manufacturing process comprises top-down or bottom-up stereolithography (e.g., continuous liquid interface production).

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

The transitional phrase "consisting essentially of" means that the scope of a claim is to be interpreted to encompass the specified materials or steps recited, and also additional materials or steps that do not materially affect the basic and novel characteristics of the claimed invention as described herein.

"ABPU" or "reactive blocked polyurethane" as used herein refers to UV-curable, (meth)acrylate blocked, polyurethane/polyurea (i.e., reactive blocked polyurethane) such as described in U.S. Pat. Nos. 9,453,142 and 9,598,606 to Rolland et al. A particular example of a suitable reactive (or UV-curable) blocking group is a tertiary amine-containing (meth)acrylate (e.g., t-butylaminoethyl methacrylate, TBAEMA, tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof).

In some embodiments, non-reactive blocked polyurethane may be further provided in the composition, including but not limited to an ABPU that has one end that is blocked by a non-reactive group (while another end may be reactive). Such non-reactive blocking groups may include, for example, DMP, MEKO, etc.

Polyisocyanates (including diisocyanates) useful in carrying out the present invention include, but are not limited to, 1,1'-methylenebis(4-isocyanatobenzene) (MDI), 2,4-diisocyanato-1-methylbenzene (TDI), methylene-bis(4-cyclohexylisocyanate) ($H_{12}$MDI), hexamethylene diisocyanate (HDI), isophorone diisocyanate (IPDI), polymeric MDI, 1,4-phenylene diisocyanate (PPDI), and o-tolidine diisocyanate (TODI). A preferred diisocyanate in some embodiments is $H_{12}$MDI, such as Desmodur® W, supplied by Covestro AG (Leverkusen, Germany). Additional examples include but are not limited to those given in U.S. Pat. No. 3,694,389 to Levy.

Chain extenders useful for carrying out the present invention (e.g., for use as a fusing agent) are known. Examples include, but are not limited to, polyols such as diols (such as ethylene glycol, 1,3-propane diol, 1,4-butanediol, 1,6-hexanediol, hydroquinone bis(2-hydroxyethyl) ether, 1,4-cyclohexanedimethanol), aliphatic, aromatic, and mixed aliphatic and aromatic, polyamines, such as diamines (for example, 4,4'-methylenedicyclohexanamine (PACM), 4,4'-methylenebis(2-methylcyclohexyl-amine) (MACM), ethylene diamine, isophorone diamine, diethyltoluenediamine), and polyetheramines (for example JEFFAMINE® from Huntsman Corporation, The Woodlands, Tex.).

Photoinitiators useful in the present invention include, but are not limited to, diphenyl(2,4,6-trimethylbenzoyl)phosphine oxide (TPO), phenylbis(2,4,6-trimethylbenzoyl)phosphine oxide (PPO), 2-isopropylthioxanthone and/or 4-isopropylthioxanthone (ITX), etc.

"Diluents" as used herein includes both UV-curable diluents (for example monoacrylates, mono-methacrylates, polyacrylates, polymethacrylates, acrylamides, methacrylamides, etc.), and non-UV-curable diluents (for example, plasticizers such as bis(2-ethylhexyl) phthalate, bis(2-propylheptyl) phthalate, diisononyl phthalate, tri-(2-ethylhexyl) trimellitate, bis(2-ethylhexyl) adipate, diisononyl adipate, dibutyl sebacate, diisobutyl maleate, etc.).

"Solvents" as used herein includes, for example, diethyl ether, tetrahydrofuran, ethyl acetate, benzene, toluene, N,N-dimethylformamide, propylene carbonate, dimethyl carbonate, etc.

"Soft segment" and "hard segment" as used herein have their usual meaning in the polymer chemistry field. "Soft segment" refers to a typically oligomeric (or repeating low molecular weight) segment of the polyurethane chain that has a glass transition temperature less than room temperature, is generally amorphous or partially crystalline, provides flexibility to the copolymer, and generally has a large number of degrees of freedom. "Hard segment" as used herein refers to a higher glass transition temperature, generally crystalline, rigid, segment that can provide mechanical integrity or strength to the segmented copolymer.

Reactive extrusion as used herein is known and can be carried out in accordance with any suitable technique. See, e.g., D. Crawford, *Extrusion—back to the future: Using an established technique to reform automated chemical synthesis*, Beilstein J. Org. Chem. 13, 65-75 (2017); see also U.S. Pat. Nos. 6,552,124 and 5,801,224.

1. Single-Cure Additive Manufacturing Resins Containing ABPUs.

Dual cure additive manufacturing resins containing ABPUs are described in, for example, U.S. Pat. Nos. 9,453,142 and 9,598,606 to Rolland et al. In the present invention, the resin can consist essentially of the same ingredients as found in such a dual cure resin, but with at least one constituent required for the second or subsequent cure (i.e., the chain extender(s)) omitted or substantially omitted.

A. Light-polymerizable monomers and/or prepolymers. Sometimes also referred to as "Part A" of a dual cure resin, these are monomers and/or prepolymers that can be polymerized by exposure to actinic radiation or light. This resin can comprise difunctional or polyfunctional monomers, but can also include monofunctional monomers. In contrast to a dual cure resin, where the amount of this "part A" corresponds to 50 to 90% by weight of the total resin (polymerizable liquid) composition, in the present invention these prepolymers and/or monomer correspond to more than 90 or 95 percent by weight of the total resin composition.

Examples of suitable reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

Note that, in the present invention, the light polymerizable component, once polymerized, is one which can degrade (e.g., during heating or baking) to form a constituent for further (e.g., heat) cure. Thus, it is converted, in part, to a "Part B" thermally reactive component, though other portions (e.g., remaining light-reactive blocking groups such as t-BAEMA), may not participate in the further cure. In a "dual cure" additive manufacturing resin, the additional part B thermally reactive components (e.g., chain extenders) are carried in the green, light cured, object, where they participate in a subsequent cure to impart desired physical properties to the object. In the present invention, these components are left out, or substantially left out, and added at a subsequent stage (e.g., during recycling, or during a subsequent production step).

B. Additional resin ingredients. Photoinitiators included in the polymerizable liquid (resin) can be any suitable photoiniator, including type I and type II photoinitiators and including commonly-used UV photoinitiators, examples of which include but are not limited to, acetophenones (diethoxyacetophenone for example), phosphine oxides such as diphenyl(2,4,6-trimethylbenzoyl)phosphine oxide, phenyl-bis(2,4,6-trimethylbenzoyl) phosphine oxide (PPO), Irgacure® 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 μm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058, 6,916,867, 7,157,586, and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, U.S. Patent Application Publication No. 20150184039, as well as U.S. Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation (Tokyo, Japan) under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

Organic diluents. In some embodiments, diluents for use in the present invention are preferably reactive organic diluents; that is, diluents that will degrade, isomerize, cross-react, or polymerize, with themselves or a light polymerizable component, during the additive manufacturing step. Such reactive diluents may comprises an acrylate, a methacrylate, a styrene, an acrylic acid, a vinylamide, a vinyl ether, a vinyl ester, polymers containing any one or more of the foregoing, and combinations of two or more of the foregoing (e.g., acrylonitrile, styrene, divinyl benzene, vinyl toluene, methyl acrylate, ethyl acrylate, butyl acrylate, methyl (meth)acrylate, an amine (meth)acrylate, and mixtures thereof). In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, isobornyl methacrylate, N,N-dimethylacrylamide, N-vinyl-2-pyrrolidone, N-vinyl formamide, an amine (meth)acrylate (such as tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof), or a mixture if two or more thereof. The diluent may be included in the polymerizable liquid in any suitable amount, typically from 1, 5 or 10 percent by weight, up to about 30 or 40 percent by weight, or more.

2. Additive Manufacturing/Methods of Making Reactive Particulate Material.

As noted above, reactive particulate material as taught herein may be provided by recycling preformed articles (e.g., dental models) or recovered coating material, including the steps of: (a) providing preformed articles, or recovered coating material, the preformed articles produced by a process of light polymerizing a single-cure resin in an additive manufacturing (or coating) process, the resin comprising or consisting essentially of: (i) a reactive blocked polyurethane prepolymer, a reactive blocked polyurea prepolymer, a reactive blocked polyurethane-polyurea copolymer, or a combination thereof, (ii) optionally a reactive diluent, and (iii) a photo-initiator; and then (b) comminuting the preformed articles into a reactive particulate material.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234), generating oxygen as an inhibitor by electrolysis (see I. Craven et al., WO 2016/133759), and incorporating magnetically positionable particles to which the photoactivator is coupled into the polymerizable liquid (see J. Rolland, WO 2016/145,182).

Other examples of methods and apparatus for carrying out particular embodiments of CLIP, or of additive manufacturing, include but are not limited to those described in B. Feller, U.S. Patent App. Pub. No. U.S. 2018/0243976 (published Aug. 30, 2018); M. Panzer and J. Tumbleston, U.S. Patent App Pub. No. U.S. 2018/0126630 (published May 10, 2018); K. Willis and 13. Adzima, U.S. Patent App Pub. No. U.S. 2018/0290374 (Oct. 11, 2018); Batchelder et al., Continuous liquid interface production system with viscosity pump, US Patent Application Pub. No. U.S. 2017/0129169 (May 11, 2017); Sun and Lichkus, Three-dimensional fabricating system for rapidly producing objects, U.S. Patent Application Pub. No. U.S. 2016/0288376 (Oct. 6, 2016); Willis et al., 3d print adhesion reduction during cure process, U.S. Patent Application Pub. No. U.S. 2015/0360419 (Dec. 17, 2015); Lin et al., Intelligent 3d printing through optimization of 3d print parameters, U.S. Patent Application Pub. No. U.S. 2015/0331402 (Nov. 19, 2015); and D. Castanon, Stereolithography System, U.S. Patent Application Pub. No. U.S. 2017/0129167 (May 11, 2017).

As noted above, as an alternative (or in addition) to comminuting an additively manufactured object or coating, the reactive particulate material as taught herein may be formed by dispersive polymerization (e.g., an emulsion, suspension or dispersion polymerization process). Techniques for dispersive polymerization are known. See, e.g., Schmidt et al., "Novel Approaches for the Production of Polymer Powders for Selective Laser Beam Melting of Polymers," Solid Freeform Fabrication 2016: Proceedings of the 27th Annual International Solid Freeform Fabrication Symposium, pp. 762-769; Asua, "Emulsion Polymerization: From Fundamental Mechanisms to Process Developments," J of Polymer Sci: Part A: Polymer Chemistry, vo. 42, 1025-1041, 2004. See also U.S. Pat. No. 9,464,209 to Dudik et al., U.S. 2012/0171470 to Cavallin et al., and U.S. Pat. No. 8,142,868 to O'Brien et al.

In some embodiments, single-cure resin as taught herein that is remaining from an additive manufacturing process (e.g., uncured resin remaining after a part is printed), or residual resin washed/cleaned from a formed part, may be collected and used to form reactive particular material by dispersive polymerization.

The formed reactive particles (e.g., by comminuting or dispersive polymerization) may be further processed by rounding and/or dry coating, if desired, to improve properties such as particle size distribution, shape, crystallinity, powder flowability, etc. See, e.g., Schmidt et al., "Novel Approaches for the Production of Polymer Powders for Selective Laser Beam Melting of Polymers," Solid Freeform Fabrication 2016: Proceedings of the 27th Annual International Solid Freeform Fabrication Symposium, pp. 762-769.

3. Recycling of Additively Manufactured Objects/Use of Reactive Particular Material.

As noted above, the present invention provides a method of making a reactive particulate material by recycling preformed articles (e.g., dental models) or recovered coating material, including the steps of: (a) providing preformed articles, or recovered coating material, the preformed articles produced by a process of light polymerizing a single-cure resin in an additive manufacturing (or coating) process, the resin comprising or consisting essentially of: (i) a reactive blocked polyurethane prepolymer, a reactive blocked polyurea prepolymer, a reactive blocked polyurethane-polyurea copolymer, or a combination thereof, (ii) optionally a reactive diluent, and (iii) a photo-initiator; and then (b) comminuting the preformed articles into a reactive particulate material.

As also noted above, while reactive particulates can be made from recycled materials, they can also be made as an original product. Thus, a second aspect of the invention is a method of making a reactive particulate material, including the steps of: (a) free radically polymerizing a single-cure resin (e.g., by exposure to light, heating, etc.) to produce a polymer, the resin comprising: (i) a reactive blocked polyurethane prepolymer, a reactive blocked polyurea prepolymer, a reactive blocked polyurethane-polyurea copolymer, or a combination thereof, (ii) optionally a reactive diluent, and (iii) optionally, a photo-initiator; and (b) forming the polymer into a reactive particulate material by (i) forming preformed articles which are then comminuted into a reactive particulate material, or (ii) forming the polymer as a reactive particulate material by dispersive polymerization (e.g., an emulsion, suspension or dispersion polymerization process).

In some embodiments of the foregoing, the preformed article is comprised of: at least 70, 80 or 90 percent by weight of a polymer, the polymer consisting essentially of the resin in light polymerized, cross-linked, thermoset form; optionally, pigments and/or dyes; and optionally, at least one filler.

In some embodiments of the foregoing, the resin comprises not more than 1 or 5 percent by weight of a diol (or polyol) and/or polyamine chain extender; the article or model is produced by a process that does not include an additional polymerization step (e.g., a heat polymerization step) following the light polymerization step in the presence of a chain extender; the resin is solely polymerized by light polymerization in the process; and/or the resin does not include at least one constituent necessary for heat and/or microwave polymerization.

In some embodiments, the resin further comprises a nonreactive blocked polyurethane prepolymer (e.g., blocked with DMP, MEKO, etc).

In some embodiments of the foregoing, the reactive blocked polyurethane prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments of the foregoing, the reactive blocked polyurethane prepolymer comprises a (meth)acrylate-blocked polyurethane prepolymer.

In some embodiments of the foregoing, the reactive diluent comprises an acrylate, a methacrylate, a styrene, an acrylic acid, a vinylamide, a vinyl ether, a vinyl ester, polymers containing any one or more of the foregoing, and combinations of two or more of the foregoing. (e.g., acrylonitrile, styrene, divinyl benzene, vinyl toluene, methyl acrylate, ethyl acrylate, butyl acrylate, methyl (meth)acrylate, an amine (meth)acrylate such as TBAEMA, or a mixture two or more thereof).

In some embodiments of the foregoing, the reactive diluent is monofunctional (e.g., comprises isobornyl methacrylate).

In some embodiments of the foregoing, the comminuting step is carried out by grinding, shredding, chopping, or pelletizing.

In some embodiments of the foregoing, the additive manufacturing process comprises top-down or bottom-up stereolithography (e.g., continuous liquid interface production).

A further aspect of the invention is a reactive particulate material produced by a process as described herein above and below (for example, a powder comprising particles having an average size of from 1 or 2 microns, to 100, 200 or 300 microns).

A further aspect of the invention is a material set including: (a) a reactive particulate material as described herein above or below, and (b) a fusing agent. Suitable fusing agents include, but are not limited to, (i) a crosslinker such as a diisocyanate, alkyl dihalide (e.g. 1,4-dibromobutane), dicarboxylic acid, diacyl halide, diepoxide, or a mixture thereof; and/or (ii) a polyol and/or polyamine chain extender, which may be provided as a sprayable composition in some embodiments.

A further aspect of the invention is a method of coating an object in which a particulate is applied to the object with a reactive resin, wherein a reactive particulate material as described herein above and below is employed as the particulate in combination with a fusing agent as the reactive resin, optionally while heating the object before and/or after applying the particulate and resin thereto. Suitable fusing agents include, but are not limited to, (i) a crosslinker such as a diisocyanate, alkyl dihalide (e.g., 1,4-dibromobutane), dicarboxylic acid, diacyl halide, diepoxide, or a mixture thereof; and/or (ii) a polyol and/or polyamine chain extender, which may be provided as a sprayable composition in some embodiments.

A further aspect of the invention is a method of making a staple thermoplastic material, comprising: reacting a reactive particulate material as described herein above and below with a polyol and/or polyamine chain extender under conditions in which a homogeneous thermoplastic material is produced; and then forming the homogeneous thermoplastic material into either a new object, or a staple article for subsequent use (e.g., pellets, sheets, filaments, a powder, etc). In some embodiments, the reacting step is carried out by co-extrusion of the reactive particulate material with the chain extender (e.g., in a twin-screw extruder). In some embodiments, the reacting step is carried out at a temperature of 30° C. to 350° C. In some embodiments, the thermoplastic material comprises a blend of linear or branched chain extended polyurethane or polyurethane-urea polymers and poly(isobornyl methacrylate-co-tert-butylaminoethyl methacrylate). A staple article produced by such a method may be in the form of pellets, sheets, or a powder, for example a powder comprising particles having an average size of from 1 or 2 microns, to 100, 200 or 300 microns. A new article may be formed from such staple articles by any suitable technique, such as by forming a new article, or a coating on an object, from the staple article (e.g., by injection molding, blow molding, thermoforming, selective laser sintering, jet fusion, powder coating, etc.).

Jet fusion. Methods and apparatus for making three-dimensional objects in which a solid particulate (provided in a powder bed) is bound or fused by patterned application of a liquid fusing agent are known and described in, for example, A. Kabalnov et al., U.S. Patent Application Publication No. U.S. 20180015664; J. Stasiak, PCT Application No. WO 2017/189306; and H. Ng et al., PCT Patent Application No. WO 2016/068899 (all to Hewlett Packard), the disclosures of which are incorporated herein by reference. Additional ingredients that can be incorporated with reactive particulates and fusing agents to create material sets useful for making three dimensional objects by such methods include, but are not limited to (for powder beds), those described in K. Prasad et al., PCT Patent Application No. WO 2017/188966; Y. Feng et al., PCT Patent Application WO 2017/196358; K, Erickson et al., PCT Patent Application WO 2017/196321; Y. Feng et al., PCT Patent Application WO 2017/196364; Y. Feng et al., PCT Application WO 2017/196361; A. Emamjomeh, PCT Application WO2017/213666; and J. Stasiak, PCT Application WO 2018/022051 (all to Hewlett Packard), the disclosures of which are incorporated herein by reference.

Accordingly, a further aspect of the invention is a method of making a three-dimensional object in which a fusing agent is applied to a bed of a particulate material in sequential patterned repetitions thereof, wherein a reactive particulate material as described herein above is used as the particulate material. The fusing agent may be provided as a sprayable composition in some embodiments. Suitable fusing agents include, but are not limited to, (i) a crosslinker such as a diisocyanate, alkyl dihalide (e.g. 1,4-dibromobutane), dicarboxylic acid, diacyl halide, diepoxide, or a mixture thereof; and/or (ii) a polyol and/or polyamine chain extender. In some embodiments, the method may comprise heating the particulate before and/or after the fusing agent is applied. Material sets as noted above may be provided to carry out such methods.

The present invention is explained in greater detail in the following non-limiting Examples.

EXAMPLE 1

Resin for Production of a Recyclable Dental Model

In the following, the reactive blocked polyurethane prepolymer (ABPU) is the reaction product of a diisocyanate (e.g. isophorone diisocyanate) and a polyol (e.g. PTMO) in a 1 to 1 molar ratio of hydroxyl groups relative to blocked NCO groups (although a ratio greater than 1:1 may in some embodiments be preferred, to improve processability and tune the molecular weight of the chain extended polymer). The remaining isocyanate groups then are capped with tert-butylaminoethyl methacrylate (TBAEMA) forming a blocked isocyanate prepolymer with methacrylic chain ends. See, e.g., U.S. Pat. Nos. 9,453,142 and 9,598,606 to Rolland et al. A molar excess of diisocyanate is used during ABPU synthesis leading to the formation of TBAEMA-blocked diisocyanates which can serve as rigid crosslinkers during the photopolymerization.

TABLE 1

RESIN INGREDIENTS

| Component | Description | wt % | Typical range wt % |
|---|---|---|---|
| Isobornyl methacrylate | Monofunctional methacrylate monomer | 26.5 | 15-45 |
| ABPU | TBAEMA-blocked isocyanate prepolymer | 72 | 55-85 |
| Pigments | Pigment | 0.5 | 0-1 |
| Diphenyl(2,4,6-trimethyl-benzoyl) phosphine oxide | Photoinitiator | 1 | 0.1-5 |

Upon recycling of additively manufactured products produced by such resins, different materials properties can be obtained, as discussed further below.

EXAMPLE 2

Resin for Production of a Recyclable Dental Model

This example is similar to Example 1 above, except an additional monofunctional monomer is included.

TABLE 2

RESIN INGREDIENTS

| Component | Description | wt % |
|---|---|---|
| Isobornyl methacrylate | Monofunctional methacrylate monomer | 11.5 |
| Tetrahydrofurfuryl methacrylate | Monofunctional methacrylate monomer | 12 |
| ABPU | TBAEMA-blocked isocyanate prepolymer | 75 |
| Pigments | Pigment | 0.5 |
| Diphenyl(2,4,6-trimethylbenzoyl) phosphine oxide | Photoinitiator | 1 |

EXAMPLE 3

Resin for Production of a Recyclable Dental Model

This example is similar to Example 1 above, except the ABPU contains extra hard segment.

TABLE 3

RESIN INGREDIENTS

| Component | Description | wt % |
|---|---|---|
| Isobornyl methacrylate | Monofunctional methacrylate monomer | 33.5 |
| ABPU with extra hard segment | TBAEMA-blocked isocyanate prepolymer | 65 |
| Pigments | Pigment | 0.5 |
| Diphenyl(2,4,6-trimethylbenzoyl) phosphine oxide | Photoinitiator | 1 |

EXAMPLE 4

Production of Initial Objects

The formulations of Examples 1-3 are used to prepare a crosslinked three-dimensional object by light polymerization in any suitable additive manufacturing technique, such as by bottom-up stereolithography (for example, by continuous liquid interface production). In such processes, the ABPU copolymerizes with a monofunctional reactive diluent (e.g. isobornyl methacrylate) in the presence of the photoinitiator to form a robust material in objects such as dental models.

EXAMPLE 5

Production of Reactive Particulate Product

Crosslinked objects prepared as described in Example 4 above (when defective, or when use is complete, including discarded portions of objects such as supports) are then processed by milling or grinding to obtain a reactive particulate material, such as a powder or pellets. The specific form of the particulate material will depend on the ultimate use thereof.

EXAMPLE 6

Production of Staple Thermoplastic Materials for Subsequent Use

Pellets produced as described in Example 5 are subjected to reactive extrusion (e.g., in an Xtrutech XTS 24 bench top twin screw extruder) with a stoichiometric amount of suitable chain extender such as a diamine and/or diol. Particular chain extenders include: 1,4-butanediol, di(4-amino-3-methylcyclohexyl)methane (MACM), and Jeffamine® D400 (polyetheramine).

While the reaction can be exothermic, heating of the reactants to an elevated temperature (up to 350° C.) can optionally be included during extrusion, and a catalyst can optionally be added to the reactants, to drive the reaction between the TBAEMA-blocked isocyanates and chain extender. Particular examples of suitable catalysts include, but are not limited to, stannous octoate, dibutyltin dilaurate, and zirconium chelate complexes such as K-Kat 6212.

During the extrusion process, the crosslinked UV curable material is converted to a blend of linear chain extended polyurethane or polyurethane-urea polymers and poly(isobornyl methacrylate-co-tert-butylaminoethyl methacrylate). The new material can be immediately thermally processed by established techniques to obtain a new object, or can be formed into a staple article such as pellets, sheets, powders, or the like, for subsequent thermal processing.

The foregoing is illustrative of the present invention, and is not to be construed as limiting thereof. The invention is defined by the following claims, with equivalents of the claims to be included therein.

We claim:

1. A method of making a reactive particulate material by recycling a preformed article or recovered coating material, comprising:

(a) providing a preformed article, or recovered coating material, produced by a process of light polymerizing a single-cure resin in an additive manufacturing or coating process, wherein said resin is solely polymerized by light polymerization in said process, the resin comprising more than 90% by weight of: (i) a reactive blocked polyurethane prepolymer, a reactive blocked polyurea prepolymer, a reactive blocked polyurethane-polyurea copolymer, or a combination thereof, and (ii) optionally a monofunctional reactive diluent; wherein said resin further comprises: (iii) a photo-initiator, wherein said reactive blocked polyurethane prepolymer, reactive blocked polyurea prepolymer, reactive blocked polyurethane-polyurea copolymer, or combination thereof is blocked with a tertiary amine-containing (meth)acrylate selected from t-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof, and wherein said resin does not include a chain extender for heat and/or microwave polymerization of a thermally reactive component of the reactive blocked polyurethane prepolymer, reactive blocked polyurea prepolymer, or reactive blocked polyurethane-polyurea copolymer; and then (b) comminuting said preformed article or coating material into a reactive particulate material.

2. The method of claim 1, wherein said preformed article or recovered coating material is comprised of a polymer, said polymer consisting essentially of said resin in light polymerized, cross-linked, thermoset form;
optionally, pigments and/or dyes; and
optionally, at least one filler.

3. The method of claim 1, wherein said single-cure resin further comprises a nonreactive blocked polyurethane prepolymer.

4. The method of claim 1, wherein said tertiary amine-containing (meth)acrylate is t-butylaminoethyl methacrylate (TBAEMA).

5. The method of claim 1, wherein said tertiary amine-containing (meth)acrylate is selected from t-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), and mixtures thereof.

6. The method of claim 1, wherein said monofunctional reactive diluent is present and comprises an acrylate, a methacrylate, a styrene, an acrylic acid, a vinylamide, a vinyl ether, a vinyl ester, polymers containing any one or more of the foregoing, or a combination of two or more of the foregoing.

7. The method of claim 1, wherein said monofunctional reactive diluent is present and comprises isobornyl methacrylate.

8. The method of claim 1, wherein said comminuting step is carried out by grinding, shredding, chopping, or pelletizing.

9. The method of claim 1, wherein the additive manufacturing process comprises top-down or bottom-up stereolithography.

10. A reactive particulate material produced by a process comprising:
(a) providing a preformed article, or recovered coating material, produced by a process of light polymerizing a single-cure resin in an additive manufacturing or coating process, wherein said resin is solely polymerized by light polymerization in said process, the resin comprising more than 90% by weight of: (i) a reactive blocked polyurethane prepolymer, a reactive blocked polyurea prepolymer, a reactive blocked polyurethane-polyurea copolymer, or a combination thereof, and (ii) optionally a monofunctional reactive diluent; wherein said resin further comprises: (iii) a photo-initiator,
wherein said reactive blocked polyurethane prepolymer, reactive blocked polyurea prepolymer, reactive blocked polyurethane-polyurea copolymer, or combination thereof is blocked with a tertiary amine-containing (meth)acrylate selected from t-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof, and wherein said resin does not include a chain extender for heat and/or microwave polymerization of a thermally reactive component of the reactive blocked polyurethane prepolymer, reactive blocked polyurea prepolymer, or reactive blocked polyurethane-polyurea copolymer; and then (b) comminuting said preformed article or coating material into a particulate material,
to thereby produce the reactive particulate material.

11. A material set comprising:
(a) a reactive particulate material of claim 10 as a powder bed material; and
(b) a fusing agent, said fusing agent comprising a polyol and/or polyamine chain extender.

12. The material set of claim 11, wherein the fusing agent comprises a sprayable composition, optionally further comprising a crosslinker selected from the group consisting of a diisocyanate, alkyl dihalide, dicarboxylic acid, diacyl halide, diepoxide, and a mixture thereof.

13. A method of making a three-dimensional object, comprising:
applying a fusing agent to a bed of a particulate material in sequential patterned repetitions thereof; and
employing a reactive particulate material of claim 10 as the particulate material in combination with the fusing agent, said fusing agent comprising a polyol and/or polyamine chain extender, optionally while heating said particulate before and/or after said fusing agent is applied.

14. A method of coating an object, comprising:
applying a particulate to the object with a reactive resin; and
employing a reactive particulate material of claim 10 as the particulate in combination with a polyol and/or polyamine chain extender as the reactive resin, optionally while heating the object before and/or after applying said particulate and resin thereto.

15. A method of making a staple thermoplastic material, comprising:
reacting a reactive particulate material of claim 10 with a polyol and/or polyamine chain extender, wherein said reacting is carried out by heating the reactive particulate material with the polyol and/or polyamine chain extender, whereby a homogeneous thermoplastic material is produced; and then
forming said homogeneous thermoplastic material into either a new object, or a staple article for subsequent use.

16. The method of claim 15, wherein said reacting step is carried out by co-extrusion of said reactive particulate material with said chain extender.

17. The method of claim 15, wherein said reacting step is carried out at a temperature of 30° C. to 350° C.

18. The method of claim 15, wherein said reactive particulate material comprises light polymerized reactive blocked polyurethane prepolymer, reactive blocked polyurea prepolymer, reactive blocked polyurethane-polyurea copolymer, or combination thereof blocked with tert-butylaminoethyl methacrylate, copolymerized with isobornyl methacrylate, and wherein said thermoplastic material comprises a blend of linear or branched chain extended polyurethane or polyurethane-urea polymers and poly(isobornyl methacrylate-co-tert-butylaminoethyl methacrylate).

19. A method of making a recyclable preformed article, comprising:
   (a) providing a single-cure resin comprising more than 90% by weight of: (i) a reactive blocked polyurethane prepolymer, a reactive blocked polyurea prepolymer, a reactive blocked polyurethane-polyurea copolymer, or a combination thereof, and (ii) optionally a monofunctional reactive diluent; wherein said resin further comprises: (iii) a photo-initiator,
   wherein said reactive blocked polyurethane prepolymer, reactive blocked polyurea prepolymer, reactive blocked polyurethane-polyurea copolymer, or combination thereof is blocked with a tertiary amine-containing (meth)acrylate selected from t-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof, and
   wherein said resin does not include a chain extender for heat and/or microwave polymerization of a thermally reactive component of the reactive blocked polyurethane prepolymer, reactive blocked polyurea prepolymer, or reactive blocked polyurethane-polyurea copolymer; and then
   (b) light polymerizing said resin in an additive manufacturing process to produce said preformed article, wherein said resin is solely polymerized by light polymerization in said process; and then
   (c) comminuting the preformed article, optionally wherein the comminuting step is carried out by grinding, shredding, chopping, or pelletizing.

20. The method of claim 19, wherein said preformed article is comprised of a polymer, said polymer consisting essentially of said resin in light polymerized, cross-linked, thermoset form;
   optionally, pigments and/or dyes; and
   optionally, at least one filler.

21. The method of claim 19, wherein said tertiary amine-containing (meth)acrylate is t-butylaminoethyl methacrylate (TBAEMA).

22. The method of claim 19, wherein said tertiary amine-containing (meth)acrylate is selected from t-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), and mixtures thereof.

23. The method of claim 19, wherein said monofunctional reactive diluent is present and comprises an acrylate, a methacrylate, a styrene, an acrylic acid, a vinylamide, a vinyl ether, a vinyl ester, polymers containing any one or more of the foregoing, or a combination of two or more of the foregoing.

24. The method of claim 19, wherein said monofunctional reactive diluent is present and comprises isobornyl methacrylate.

25. The method of claim 19, wherein the additive manufacturing process comprises top-down or bottom-up stereolithography.

* * * * *